Figure 1:
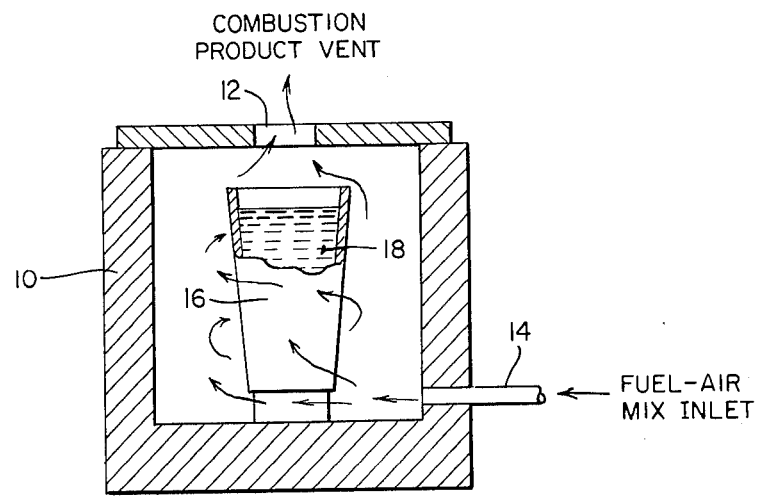

United States Patent [19]

Miller

[11] 3,892,562
[45] July 1, 1975

[54] PROCESS FOR PRODUCING HIGH PURITY SILVER

[75] Inventor: Jaydee W. Miller, Wallingford, Pa.

[73] Assignee: Pyromet, Inc., Wallingford, Pa.

[22] Filed: Aug. 21, 1972

[21] Appl. No.: 282,029

Related U.S. Application Data

[63] Continuation-in-part of Ser. Nos. 4,335, Jan. 20, 1970, abandoned, and Ser. No. 93,750, Nov. 30, 1970, abandoned.

[52] U.S. Cl. .............................. 75/83; 75/60; 75/63
[51] Int. Cl. ............................................ C22b 11/00
[58] Field of Search ............... 75/60, 63, 83, 75, 76, 75/56; 266/35, 37

[56] References Cited
UNITED STATES PATENTS

| | | | |
|---|---|---|---|
| 109,743 | 11/1870 | Kirk | 75/83 |
| 252,817 | 1/1882 | Tunbridge | 75/83 |
| 336,792 | 1/1886 | Bryan | 75/83 |
| 519,217 | 5/1894 | Allen | 75/83 |
| 1,004,676 | 10/1911 | Neilly | 75/83 |
| 1,896,807 | 2/1933 | Bauer | 75/83 |
| 2,944,886 | 7/1960 | Fisher et al. | 75/83 |
| 2,989,397 | 6/1961 | Kuzzell et al. | 75/76 |
| 3,136,627 | 6/1964 | Caldwell et al. | 75/63 |
| 3,214,268 | 10/1965 | Lundeyall et al. | 75/63 |
| 3,615,362 | 10/1971 | Warner | 75/75 |
| 3,632,335 | 1/1972 | Worner | 75/63 |
| 3,671,222 | 6/1972 | Johnson | 75/83 |
| 3,689,049 | 9/1972 | Brumagin et al. | 266/37 |

FOREIGN PATENTS OR APPLICATIONS

| | | | |
|---|---|---|---|
| 947,741 | 1956 | Germany | 75/83 |
| 676,675 | 1939 | Germany | 75/75 |

OTHER PUBLICATIONS

Liddell, D.; Handbook of Nonferrous Metallurgy, New York, 1945, p. 294, [TN665L6].

*Primary Examiner*—Walter R. Satterfield
*Attorney, Agent, or Firm*—Barry A. Bisson

[57] ABSTRACT

High purity silver, i.e. above 99.9%, is obtained in a two-step process wherein in the first step, a melt of about 99.5% silver, 0.5% sulfur is produced preferably by heating a silver-sulfur or a silver-sulfur-zinc combination such as is obtained by electrolysis of photographic hypo solutions or by the addition of zinc powder to spent photographic hypo solutions in an atmosphere having an excess of oxygen, (e.g., air, 100% oxygen, etc.). In this first stage a flux or similar reagent can be present but is not preferred. Almost all of the remaining sulfur is removed in the second stage of the process in which oxygen is bubbled through and/or over the melt and reacts therein with dissolved silver sulfide to produce sulfur dioxide which escapes from the melt with a violent boiling action. Silver powder or sponge can be produced by condensation of splatter. The endpoint of the process is determined by the cessation of this violent boiling action indicating that a purity of 99.9+% silver has been obtained. This second stage must be performed in the absence of a slag, flux, or similar material.

7 Claims, 2 Drawing Figures

INVENTOR.
Jaydee W. Miller

BY
Paul + Paul
ATTORNEYS.

PROCESS FOR PRODUCING HIGH PURITY SILVER

BACKGROUND

This is a continuation in part of my application Ser. No. 4335 filed Jan. 20, 1970, and now abandoned, titled "Process for Producing High Purity Silver", and of my application Ser. No. 93,750 filed Nov. 30, 1970 and now abandoned. The disclosure of both of these patent applications is hereby incorporated herein by reference.

Known prior art processes for producing very high purity silver are generally expensive and inefficient. Electroplating silver is the most common method used where extremely high purity silver product is required.

It is therefore the general object of the present invention to provide a method of producing ultra pure silver which is less expensive and more efficient (e.g., less manual handling) than processes used for this purpose to date.

It is a more specific object of this invention to provide a process for recovering silver, in ultra pure form, from mixtures of silver with sulfur or silver sulfide with zinc. Such a mixture occurs as the precipitate in spent photographic hypo solutions when zinc powder is added to precipitate silver.

DESCRIPTION OF THE INVENTION

These and other objects are met by a two stage process, the first stage of which comprises producing a melt of about 99.5% silver and 0.5% sulfur. Preferably this first stage consists essentially of heating to 950°–1200°C, in the presence of excess oxygen, a silver containing mixture, which includes as impurities zinc and sulfur. The sulfur may be present as silver sulfide. The mixture is held at this temperature for a sufficient length of time to permit the zinc to vaporize and oxidize and most of the sulfur to oxidize. These impurities therefore escape as gaseous products. In the second stage of this process the molten mixture of about 99.5% silver 0.5% sulfur is further purified by bubbling oxygen through the melt. The oxygen dissolves in the melt and reacts with the residual sulfur, present as dissolved silver sulfide, in the molten metal to produce sulfur dioxide and pure silver. This stage of the process is characterized by a violent boiling action at the surface of the molten silver due to escaping sulfur dioxide. The violent boiling action does not occur if the purity of the silver is much below 99.5% and ceases when substantially all the residual sulfur has been removed from the molten metal, at which time the silver product has a purity above 99.9%.

The starting material for the prefered first stage of this process can contain in the range of 0 – 35% water (preferably it is dried to 0 – 10% water) and may comprise (on a bone-dry basis), for example, an 80% silver, 5% sulfur, and 5% zinc mixture which is readily available as a precipitate from spent photographic hypo solutions treated with zinc powder to precipitate silver metal. Small amounts (up to 10%) of oxygen, sodium and organic material can also be present in the precipitate. Another starting material is about 95% silver, 5% sulfur and can be obtained by electrolysis of photographic hypo solutions.

This preferred first stage is carried out in a closed furnace with a vent for the escape of water vapor and gaseous combustion products. A fuel, such as propane or natural gas, is admitted to the furnace with sufficient air to provide an amount of oxygen about 15% in excess of that necessary for complete oxidation of the fuel. The silver mixture is contained in a boat in the furnace about which fuel, air, and gaseous combustion products are free to circulate. During the second stage of the process, a flat member is preferably disposed just above the violently boiling molten silver as oxygen is bubbled through the molten silver so that metallic silver ejected from the melt by the boiling action is solidified on the underside of the flat member and may later be remelted and reintroduced into the pure silver melt, or this solidified metallic silver (which typically is highly porous) can be recovered and utilized as a catalyst, electrode for batteries, etc. The porous articles can have, for example, about 35 volume % void space. If, instead of a flat member to cover the boat, an inverted crucible is used, a fine silver powder will collect on the cold regions. This powder consists essentially of small spheres. This silver powder can be utilized in electrically conductive paints.

FURTHER DESCRIPTION OF THE INVENTION

Figure 2:
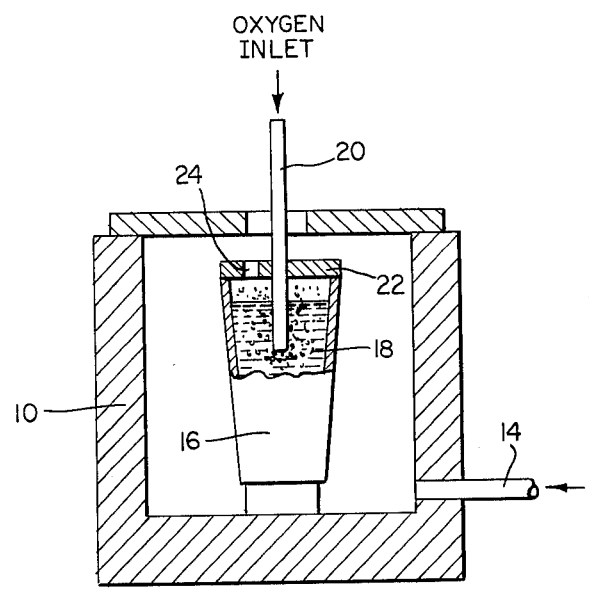

This invention, which is specifically set forth in the claims appended hereto, may be better understood from the following detailed description taken in conjunction with the accompanying drawings in which FIG. 1 is a cross-sectional view of the furnace and boat used therein during the preferred initial purification stage of the process of the present invention; and FIG. 2 is a similar cross-section of the furnace during the final purification stage of the process of the present invention.

Referring more specifically to FIG. 1, there is shown, in cross-section, a furnace enclosure 10 having a vent 12 for gaseous combustion products and an inlet 14 for fuel, generally a gaseous fuel such as propane or natural gas, and air or oxygen. In another embodiment (not shown) heat can be furnished (in whole or in part) by other means as by an induction furnace. A boat is disposed in furnace enclosure 10 such that air, fuel, and gaseous combustion products may circulate thereabout. A powdered mixturue including silver, sulfur, and zinc is charged to the furnace in boat 16 and additional quantities of this mixture are added to the boat as the previously added portions melt so that finally the boat is substantially filled with a molten mixture 18 of the silver-containing material.

During the preferred purification stage of the process of the present invention fuel and air are introduced into the furnace enclosure and are burned therein so as to heat the contents of the furnace, more specifically the silver-containing material 18 and boat 16, to a temperature above the melting point of silver, generally 950°–1200°C but preferably 1100°–1200°C. An excess of air is deliberately added over that needed to react completely with the fuel so that there is an excess of oxygen in the atmosphere surrounding the molten silver-containing material which tends to oxidize most of the sulfur, zinc and other impurities in the material. Generally the pressure in furnace enclosure 10 is about atmospheric. The zinc in the silver-containing material vaporizes from the mixture and escapes from furnace enclosure 10, either in metallic or oxidized form, with gaseous combustion products and any unused gas from the fuel-air mixture through combustion product vent 12. The oxidation of sulfur and other impurities, in this stage, occurs at the molten metal surface. Increasing the area of this surface will cause the reaction to proceed faster.

The time required for the silver-containing material in the furnace to be freed of the zinc and for most of the sulfur and other impurities therein to be oxidized will vary depending upon the temperature in the furnace, the configuration of the boat, and the circulation space around the boat, the amount of silver-containing material in the boat, and the concentration of impurities therein and the availability of excess oxygen in the furnace enclosure. Generally, with the air and fuel mixture to the furnace adjusted so that there is about 15% molar excess of air over that required to completely burn the fuel and with a charge (on a bone-dry basis) of 80% silver, 5% zinc and 5% sulfur sufficient to produce about 2500 troy ounces of pure silver, the time required in a furnace enclosure of the geometry shown in FIG. 1 to complete the preferred initial purification stage is on the order of several hours.

The completion of the preferred initial purification stage occurs when the vaporizable metal has been completely vaporized and the sulfur content of the silver has been reduced to about 0.5% at which point the remaining sulfur is present as dissolved silver sulfide. This point is easily recognizable by the fact that if oxygen is bubbled into the molten material, as is done in the next and final purification stage, no rapid reaction between oxygen and sulfur will be evident. Eventually, however, as the purity of the silver approaches 99.5% oxygen bubbled through the melt will tend to dissolve therein and react with dissolved silver sulfide to produce sulfur dioxide which excapes from the melt with a violent boiling action at the surface of the melt.

In the final purification stage oxygen is bubbled through the melt until the violent boiling action of escaping sulfur dioxide ceases, indicating that there is essentially no remaining sulfur in the melt, at which point the melt comprises 99.9+% silver. The apparatus, as set up during this final purification stage, is shown in FIG. 2, in which there is also shown oxygen inlet tube 20 through which oxygen is injected into the molten silver below the surface thereof to cause the oxygen to bubble up through the melt. The inlet tube can be of carbon, tantalum, silicon-carbide, alumina or ceramic; however, due to the thermal shock encountered by this tube, the preferred material of construction is quartz. A flat closure member 22 with a vent 24 for the escape of gaseous materials is disposed near the surface of molten silver 18 so as to catch metallic silver ejected from the melt by the boiling action of the escaping sulfur dioxide. Upon completion of the process, the furnace enclosure may be heated again to melt this metallic silver and cause it to fall from the under-side of closure member 22 back into melt 18. It will be noted that during the final purification stage, additional heat need not be added to furnace enclosure 10 so long as the molten metal in boat 16 does not begin to solidify.

It should be noted that the final purification stage is a process step for producing 99.9+% silver from a melt of about 99.5% silver, 0.5% sulfur, regardless of how this 99.5% molten silver mixture is prepared. Broadly speaking then, with zinc containing feed stocks, the present invention comprises a two-stage process in which the second stage is as described above and the first stage may be any process for producing a melt of the desired composition. Preferably, the first stage is that described above.

This invention is particularly applicable to the purification of the precipitate from zinc-treated spent photographic hypo solutions which generally includes (on a bone-dry basis) about 80% silver, 5% sulfur, and 5 % zinc The process, however, with respect to the preferred embodiment of the first stage, is thought to be useful with any mixture of silver and sulfur or silver, sulfur and a metal, such as zinc which tends to vaporize at a temperature in the range 950°–1200°C. Mercury and cadmium are two such metals.

However, with feedstocks consisting of essentially silver as a major portion and sulfur in minor proportion, only a single purification step is necessary. For example, electrolytic (flake) silver containing about 95% silver, 5% sulfur, needs only a single oxidative, purification step.

If the flake or electrolytic silver is to be refined, the first stage is not necessary. The flake is added to the boat until it is about 75% filled with molten metal. During the melting, plenty of air should be allowed to circulate over the unmelted material. This oxidizes a lot of the sulfur at a lower temperature. On completion of melting the flat member can be placed on the boat and oxygen injection begun.

Preferably the fuel used in the preferred initial purification stage of the present invention is propane or natural gas and the excess oxygen atmosphere is provided by introducing into the furnace a mixture air with the gas in such proportions that there is roughly a 15% molar excess of air over that necessary to burn completely the fuel gas. However other hydrocarbon fuels, such as kerosene or fuel oil can be used.

Although relatively pure oxygen (i.e., 95 –100%) is the preferred oxygen source for injection in the present process, other less pure forms can be used (e.g., air, oxygen-enriched air, or other sources of oxygen in relatively inert gas). In general, the more pure the oxygen source, the more rapid the process rate to purification. For example, about 1 kilogram of an alloy containing 95% silver, 2% zinc and 3% sulfur, was melted in a crucible. Simple air oxidation was used to remove most of the zinc and sulfur. When the melt was about 99.5% silver and 0.5% sulfur, pure oxygen was introduced into the melt until boiling ceased. The experiment was repeated except that only air was used in the final purification. The results are reported below in tabular form.

|  | Wgt Charge (gms) | Oxident | Wgt Pure Silver (gms) | Rate (gms/min) |
| --- | --- | --- | --- | --- |
| Test A | 1302 | Oxygen | 1240 | 260 |
| Test B | 1140 | Air | 1082 | 160 |

Thus, it can be seen that the rate is greater with 100% oxygen than with air.

Apart from the convenience, economy, and the ultra high purity of the product in the present invention, this invention has a further advantage in that very nearly 100% of the silver in the original mixture is finally recovered in the pure form. This compares favorably with the recovery percentages of other processes for producing very high purity silver. The process also can be used to remove carbon from silver (e.g., from filter paper or in the ash from processed X-ray film).

Porous silver articles or silver powder can also be made when the oxygen source is air; however, for a given reaction vessel, gas feed rate, etc., the yield of such articles or powder will be much less (e.g., 50% to 90% less) than when relatively pure (e.g., 85 to 100%) oxygen is used. An especially useful reactor vessel for the process of the present invention is a cupelling furnace, since such a furnace exposes a relatively large surface area for the reacting oxygen. Such a large surface area is desirable in our process.

An advantageous means of recovering highly pure silver from silver sulfide ($Ag_2S$) is to mix about 50 parts by weight of $Na_2CO_3$ with 100 parts of silver sulfide and apply heat until carbon dioxide evolves and $Na_2O$ is produced. The following reaction will then occur:

$Na_2O + Ag_2S \rightarrow Na_2S + 2Ag + \frac{1}{2}O_2$

The $Na_2S$ and any excess $Na_2O$ can collect, as a liquid phase, on top of the molten silver and can be removed from the vessel, as by decanting. Oxygen can then be passed through (and/or over) the molten and somewhat impure silver to produce highly pure (99.9+ %) silver, by the previously described process.

The present invention is to be distinguished from that of German Pat. No. 947,741, Ausgegeben, Aug. 23, 1956, of Hans J. Nowacki, Wilhelm Teworte, and Peter Vossel, in that this German patent does not appreciate the value of maintaining a gaseous atmosphere directly above the molten silver (i.e., a gas-liquid interface). In the German patent, a liquid flux is maintained above the molten silver (i.e., the interface is mainly a liquid-liquid interface except in those areas of the interface which are disturbed by gas bubbles from escaping $SO_2$, etc.). It is an important feature of the present invention that the separated gaseous impurities (e.g., zinc) and gaseous decomposition products (e.g., $SO_2$) be permitted to escape in vapor phase from the reaction vessel.

If a gas-liquid interface is not maintained, the endpoint described herein (i.e., cessation of violent boiling) can not be observed and production of high purity silver is made more difficult. Furthermore, the presence of a liquid "cover" (e.g., the flux) will prevent (or greatly hinder) the purification obtained by oxidation at the molten metal surface. As I teach herein, it is prefered in the present process that the free area (i.e., gas-liquid interface) of this surface be maximized in order to speed the purification process and to insure a high purity silver product.

Another advantage of the present process over that of the German patent, is that high purity silver articles (e.g., powder, sponge, etc.) can be manufactured, as by collection on a cover member (e.g., the vented cover 12 in FIG. 1).

As has been previously noted, in the present process oxygen can be injected (or passed) through and/or over the melt of impure (e.g., 99.5 percent) silver. In many instances the purification (to 99.9+percent silver) can be effected by passing oxygen only over the surface of said melt, since the oxygen passing over the surface will, in part, dissolve in the melt at the silver-air interface. However, it should be emphasized that it is preferred to conduct the process of the present invention in the absence of a flux (or other reagent which would decrease the effective surface area).

One advantage of passing the oxygen over the surface of the melt (without using a dip tube in the melt) is that corrosion of the injection device (e.g., the dip tube) is greatly reduced. Some injection can be effected without actually dipping the injection tube into the melt by maintaining the injection tube close to the surface of the melt (e.g., one inch) and using sufficient gas pressure to insure some bubbling into the melt.

It is further obvious from the foregoing that an important element of the present invention is the maintenance of a silver-oxygen interface in or on the melt of impure silver until the purity is at least 99.9%. This requires the absence of a flux or other similar material at the final processing stage. Where the impure silver contains a flux forming impurity (e.g., a compound of an alkali metal as sodium), a flux will form at the surface of said melt and this flux must be removed prior to the final finishing stage in order to provide the required silver-oxygen interface. For example, the impure silver obtained by digestion of developed photographic film (e.g., X-ray film) to obtain a black-sludgy precipitate can contain (on a bone-dry basis) in the order of 70–85% silver (typically 80–82%), the remainder being mainly organic matter (e.g., gelatin), sodium compounds and sulfur and/or sulfur compounds. This silver can be purified by passing oxygen into and/or over a melt of this impure silver and maintaining an oxygen-silver interface by removing the sodium-containing slag which forms on the surface of the melt during said purification and especially conducting the final purification in the absence of slag or other similar material on the surface.

With sludge produced by the enzyme processes for digestion of gelatinous film, it is frequently advantageous to add soda ash (about 1 lb. per lb. of dried sludge) and even borax (0.2 lb. per lb. of soda ash) if the resulting slag is removed prior to final purification.

Zinc oxide can be present as a glass slag at the surface of the melt during purification of zinc-precipitated photographic-hypo sludge. This glass can be removed by collection on a carbon dip rod after it passes from a chunky appearance to a honey-like consistency.

Regarding the silver sponge and silver powder which can be made by the present process it is evident, when the process described herein is run, that the silver powder can be made the predominant product by controlling the distance between the cover and the surface of the melt. That is, a greater distance favors powder formation since there is a greater temperature gradient (therefore, more opportunity for powder to condense) between the melt surface and the collecting or condensing surface. A cross current of cool air, $CO_2$, nitrogen, etc., can be used to cause cooling and thus favor production of the powder. In contrast, sponge production is favored when the distance from melt surface to the collecting or condensing surface is such that there is little opportunity for powder to cool and condense prior to reaching the collecting surface (or cover member). Note that a flux, slag, or similar material at the surface of the melt during the final purification will prevent production of the desirable silver articles described herein.

The porous silver articles (or sponges) produced by my process are different from prior art porous silver articles of U.S. Pat. No. 3,052,967 to Fischer in that articles of the Fischer process must contain channels, formed by the escaping decomposition products of the resinous beads (which are decomposed in order to produce void spaces between the metal particles). Also, in the Fischer process local hot-spots can occur within the article during the decomposition, thus causing local melting, bubbling and undesirable structural irregularities. I claim:

1. A process comprising
   a. producing a melt of silver having a purity of about 99.5% and having, as an impurity, about 0.5% sulfur, the surface of said melt being kept free from slag, flux or other substance which will decrease the surface area,
   b. injecting and/or passing oxygen of 15–100% purity through and/or over said melt, thereby causing an oxygen-silver interface and violent boiling action at the surface of said melt due to escaping sulfur dioxide,
   c. maintaining a gas-liquid interface by continuing said oxygen injection and/or passing until said violent boiling motion on the surface of said melt ceases, and
   d. recovering silver having a purity above 99.9%.

2. The process of claim 1 wherein a cover member with an opening therein is disposed above the surface of said melt while oxygen is injected therein, and wherein gaseous materials emanating from said melt may escape through said opening and where metallic silver material is ejected from said melt by said violent boiling action and is caught by said cover member.

3. The process of claim 1 wherein said melt of about 99.5% silver and about 0.5% sulfur is produced by heating to a temperature of 950°–1200°C, in excess oxygen atmosphere a product of electrolysis of spent hypo solution or a mixture comprised of silver, sulfur and zinc and continuing said heating process until the sulfur content has been reduced to about 0.5%.

4. The process of claim 1 wherein oxygen is only passed over the surface of said melt.

5. The process of claim 1 wherein oxygen is injected beneath the surface of said melt by maintaining an injection tube close to the surface of said melt and wherein there is sufficient gas pressure to cause some oxygen to bubble into the melt.

6. The process of claim 1 wherein said melt of about 99.5% silver and about 0.5% sulfur is produced by
   a. digestion of developed photographic film to obtain a black-sludgy precipitate containing silver, organic matter, sodium compounds and sulfur and/or sulfur compounds,
   b. making a melt of said precipitate and passing oxygen into and/or over said melt and causing a sodium-containing slag to form on the surface of said melt,
   c. maintaining an oxygen-silver interface by removing said sodium-containing slag, and
   d. conducting the final purification in the absence of slag or other similar material on the surface of said melt.

7. The process of claim 3 wherein a glass slag with a chunky appearance forms at the surface of the melt, and wherein said slag is permitted to change to a honey-like consistency and then is removed from said surface.

* * * * *